United States Patent
May et al.

(10) Patent No.: US 8,991,734 B2
(45) Date of Patent: Mar. 31, 2015

(54) FOOD CHOPPER

(71) Applicant: Lifetime Brands, Inc., Garden City, NY (US)

(72) Inventors: William Thomas May, Locust Valley, NY (US); William Edwin Drinkwater, Greenlawn, NY (US)

(73) Assignee: Lifetime Brands, Inc., Garden City, NY (US)

( * ) Notice: Subject to any disclaimer, the term of this patent is extended or adjusted under 35 U.S.C. 154(b) by 0 days.

(21) Appl. No.: 13/775,965

(22) Filed: Feb. 25, 2013

(65) Prior Publication Data

US 2013/0232794 A1 Sep. 12, 2013

Related U.S. Application Data

(60) Provisional application No. 61/608,809, filed on Mar. 9, 2012.

(51) Int. Cl.
| | | |
|---|---|---|
| B02C 15/00 | (2006.01) |
| A47J 43/28 | (2006.01) |
| B26D 7/08 | (2006.01) |
| B26D 3/26 | (2006.01) |
| B26D 7/00 | (2006.01) |
| B26D 5/10 | (2006.01) |
| B26D 7/18 | (2006.01) |
| B26D 1/00 | (2006.01) |

(52) U.S. Cl.
CPC ............ *A47J 43/28* (2013.01); *B26D 7/088* (2013.01); *B26D 3/26* (2013.01); *B26D 7/00* (2013.01); *B26D 5/10* (2013.01); *B26D 7/1818* (2013.01); *B26D 2001/0033* (2013.01)
USPC ............................................. 241/272

(58) Field of Classification Search
USPC ............................................. 241/272
See application file for complete search history.

(56) References Cited

U.S. PATENT DOCUMENTS

| | | | | |
|---|---|---|---|---|
| 2,782,826 A * | 2/1957 | Zysset | 241/272 |
| 2,787,308 A * | 4/1957 | Popeil | 241/272 |
| 2,872,958 A * | 2/1959 | Popeil | 241/272 |
| 3,029,851 A * | 4/1962 | Zysset | 241/272 |
| 3,083,747 A * | 4/1963 | Zysset | 241/272 |
| 3,933,315 A * | 1/1976 | Popeil | 241/166 |
| 4,967,970 A * | 11/1990 | Michel | 241/169 |
| D331,170 S * | 11/1992 | Greiner | D7/693 |
| 7,152,821 B2 * | 12/2006 | Aby-Eva et al. | 241/169 |
| 7,258,292 B2 * | 8/2007 | Cheung | 241/169 |
| 2004/0149843 A1* | 8/2004 | Tang | 241/272 |
| 2006/0108466 A1* | 5/2006 | Herren | 241/272 |

* cited by examiner

*Primary Examiner* — Faye Francis
(74) *Attorney, Agent, or Firm* — Tutunjian & Bitetto, P.C.

(57) ABSTRACT

A food chopper having an integrated cutting surface for a food chopper is provided. The integrated cutting surface can be incorporated into food chopping compartment of the chopper and may include a window for allowing visual inspection of the chopped food while still within the compartment. The food chopper includes blade mechanism having at least one V-shaped blade and a blade cover/cleaner configured to maintain the at least one V-shaped blade covered from user exposure even when the food chopping compartment is removed from the chopper.

16 Claims, 14 Drawing Sheets

Fig. 1a
Fig. 1b
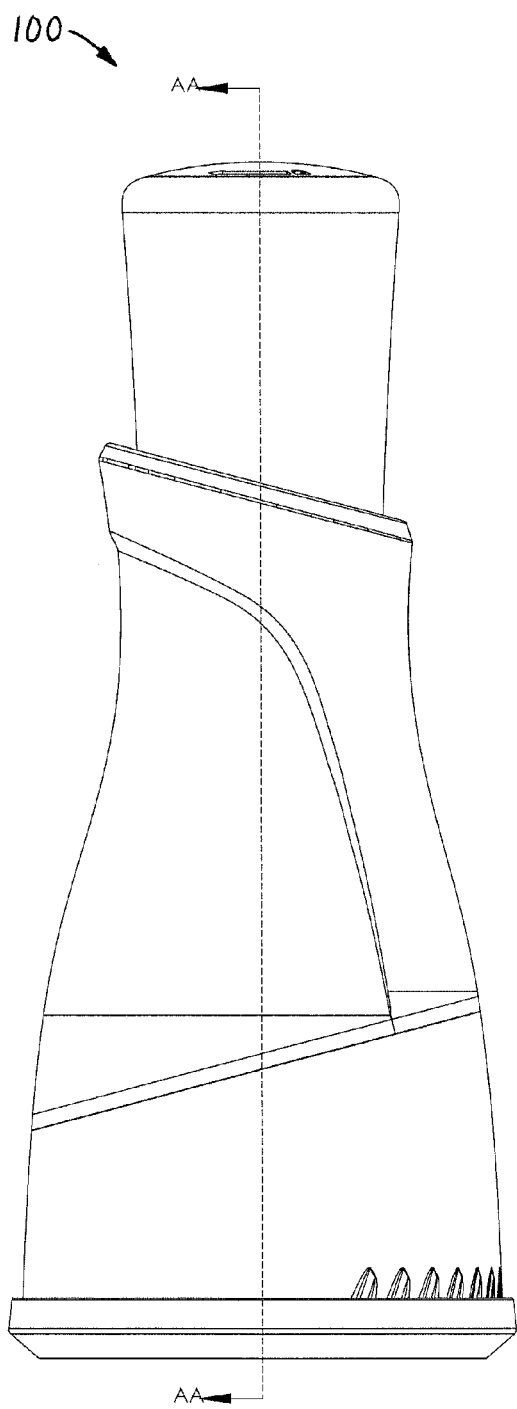
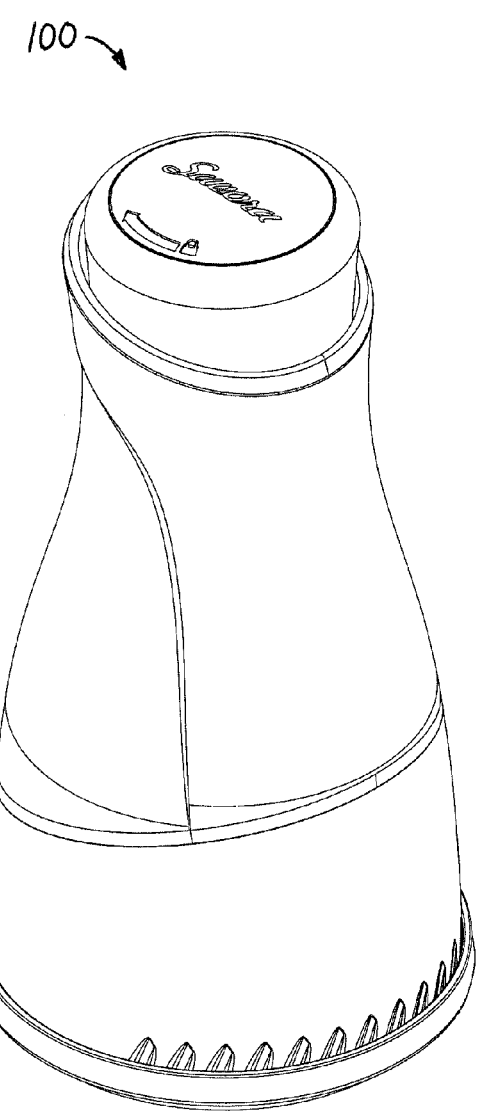

FOOD CHOPPER

CROSS REFERENCE TO RELATED APPLICATIONS

This application claims priority from U.S. Provisional Application Ser. No. 61/608,809 filed on Mar. 9, 2012, the entire contents of which is incorporated herein by reference.

BACKGROUND

1. Field of the Invention

The present invention relates in general to a food chopper, and more specifically to integrated chopping blades and blade attachments mechanisms for food choppers.

2. Description of Related Art

In the course of preparing a meal, chefs and household cooks must often chop larger portions of food into smaller pieces. Smaller pieces of food are frequently desired either because they are easier to work with, or because a certain recipes call for them. However, it is usually inconvenient for a chef or household cook to manually chop large quantities of food into smaller pieces. This is due, at least in part, to the fact to that chopping takes time and effort, especially when a large quantity of food must be chopped into very small pieces. In addition, when a knife is used for chopping, the user risks cutting himself or herself with the knife, especially when the user is in a hurry.

To improve the food-chopping experience, therefore, a number of companies manufacture and sell food choppers. With a food chopper, a user can chop large quantities of food into small pieces quickly, without using a knife.

Typical food choppers have a plunger, blade assembly, and window. To use the food chopper, a user places a quantity of food in a chopping chamber under the window. The user then presses down on the plunger, causing the blade assembly to descend downward and chop the food. If the user desires smaller pieces, the user can repeatedly press on the plunger, each time causing the chopper to chop the food into smaller pieces.

Although food choppers are very useful for chopping food into small pieces, existing food choppers have some limitations. For example, the chopping compartment of a food chopper is generally small, so large food items cannot be placed within the chopping chamber. This small size is beneficial, however, as it helps provide easy storage, packaging, and transportation of the food chopper. Accordingly, if an item of food is too large to fit within the chopping chamber, a user must use a knife, or other external cutting device, to cut the food into smaller pieces. These smaller pieces are then manually placed inside the food chopper for further chopping. This can be inconvenient to a user, as the user must make extra items dirty (the knife), and place the smaller pieces, which the user may not want to touch, into the chopper.

It would therefore be beneficial to provide a food chopper with an integrated cutting surface. It would also be beneficial if the integrated cutting surface eliminated the need for a knife and the need to manually move the food into the chopping chamber.

In addition, after use, the user typically cleans the food chopper. During cleaning, the user must clean the blades of the chopper to prevent the spread of germs and bacteria, and to ensure that the blades are clean for future use.

It would therefore be beneficial to provide a food chopper with a blade attachment mechanism that allows a user easy access to the blades for cleaning, yet does not unnecessarily or inadvertently expose the blades to the user when the food chopper is taken apart for cleaning.

Therefore, there is a need for an integrated cutting surface included in the chopping compartment of food choppers. There is also a need for a blade attachment mechanism that allows the blades of a food chopper to be easily yet safely accessed for cleaning. It is to these needs that the present invention is primarily directed.

SUMMARY

According to one implementation, the food chopper includes a body having an upper end and a lower end, a blade mechanism disposed within the body and having at least one V-shaped blade, and a food chopping compartment releasably connected to the lower end of the body. The at least one V-shaped blade comes into contact with the integrated food chopping surface during operation of the food chopper.

In accordance with an implementation, food chopper includes a plurality of V-shaped blades fixed to a blade holder. The plurality of V-shaped blades are positioned such that no one leg of any of said plurality of V-shaped blades is parallel with any other leg of any other of said plurality of V-shaped blades.

According to another aspect, the blade cover/cleaner includes means for connecting the blade cover/cleaner to the blade holder, at least one V-shaped slot configured to receive the at least one V-shaped blade, and at least one V-shaped opening at the bottom of the at least one V-shaped slot. The at least one V-shaped opening allowing the at least one V-shaped blade to move into and out of the food chopping compartment during use, and allowing the removal of chopped food from the at least one V-shaped blade when said blade is retracted back into the blade cover/cleaner.

Other aspects and features of embodiments of the present invention will become apparent to those of ordinary skill in the art, upon reviewing the following detailed description in conjunction with the accompanying figures.

BRIEF DESCRIPTION OF THE DRAWINGS

In the drawings, where like reference numerals designate corresponding parts throughout the several views:

FIG. 1a is a side view of a food chopper with an integrated cutting surface and a blade attachment mechanism, in accordance with some embodiments of the present invention;

FIG. 1b is a perspective view of a food chopper with an integrated cutting surface and a blade attachment mechanism, in accordance with some embodiments of the present invention;

DETAILED DESCRIPTION

Figures 2A, 2B:
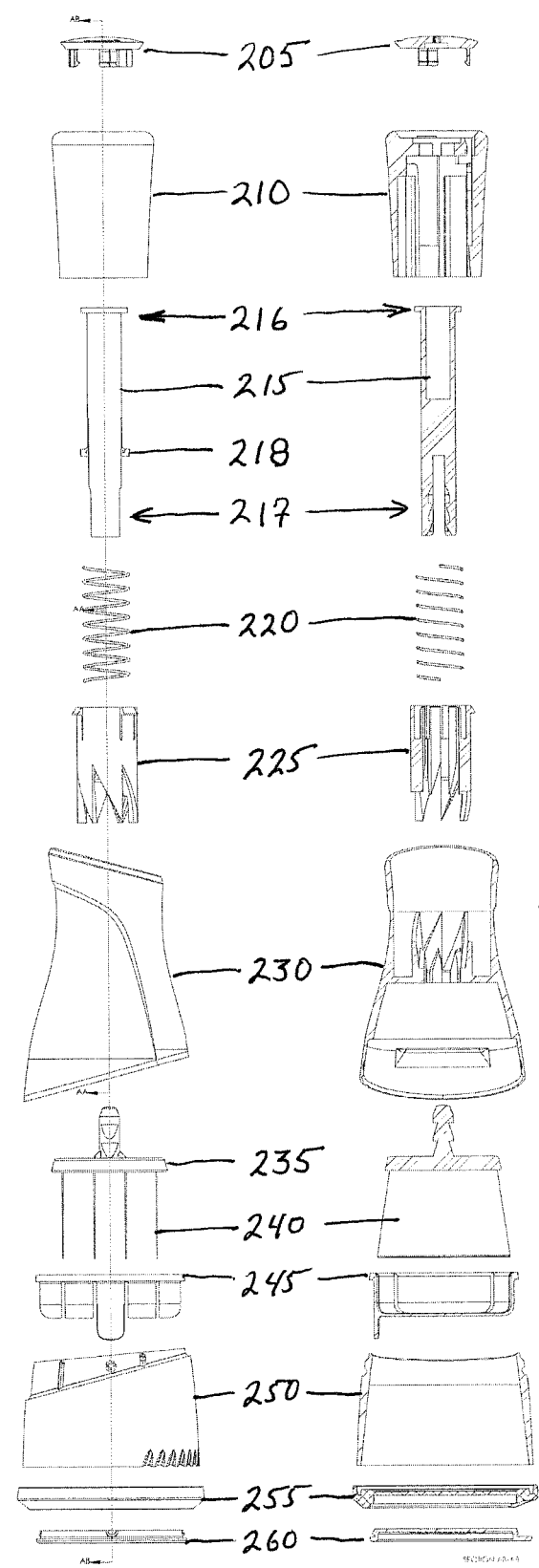
FIG. 2a is an exploded view of the food chopper of FIGS. 1a and 1b, in accordance with some embodiments of the present invention.
FIG. 2b is an exploded, cross-sectional view of the food chopper of FIGS. 1a and 1b, in accordance with some embodiments of the present invention.

Although preferred embodiments of the invention are explained in detail, it is to be understood that other embodiments are contemplated. Accordingly, it is not intended that the invention is limited in its scope to the details of construction and arrangement of components set forth in the following description or illustrated in the drawings. The invention is capable of other embodiments and of being practiced or carried out in various ways. Also, in describing the preferred embodiments, specific terminology will be resorted to for the sake of clarity.

It must also be noted that, as used in the specification and the appended claims, the singular forms "a," "an" and "the" include plural referents unless the context clearly dictates otherwise.

Also, in describing the preferred embodiments, terminology will be resorted to for the sake of clarity. It is intended that each term contemplates its broadest meaning as understood by those skilled in the art and includes all technical equivalents that operate in a similar manner to accomplish a similar purpose.

Ranges may be expressed herein as from "about" or "approximately" one particular value and/or to "about" or "approximately" another particular value. When such a range is expressed, another embodiment includes from the one particular value and/or to the other particular value.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

With reference to the drawings, embodiments of an integrated cutting surface for various food choppers with the principles and concepts of the present invention will be described. Embodiments of a blade attachment mechanism for various food choppers with the principles and concepts of the present invention will also be described.

While the embodiments described herein are intended as exemplary integrated cutting surfaces and blade attachment mechanisms for food choppers, it will be appreciated by those skilled in the art that the present invention is not limited to food choppers, and may be employed in a variety of tools, kitchen utilities, and other mechanical devices. For example, the integrated food chopping blade could be incorporated into a food storage container.

Figure 3:
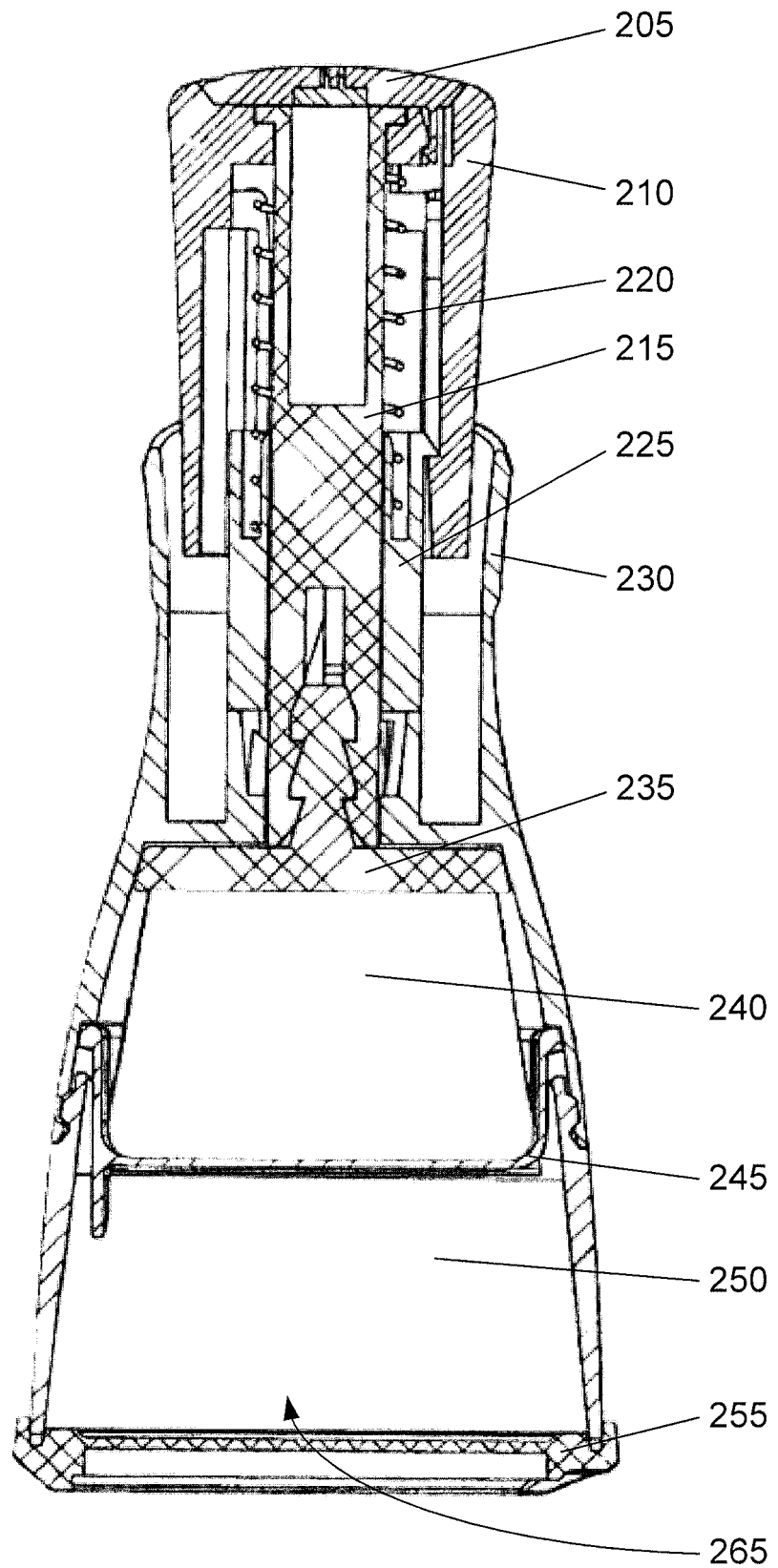
FIG. 3 is a cross-sectional view of the food chopper of FIGS. 1a and 1b, in accordance with some embodiments of the present invention.

With reference to the figures, FIGS. 1a and 1b depict a food chopper 100. FIG. 2a shows the various components of a food chopper, and FIG. 2b shows cross-sections of those components. FIG. 3 shows a cross section of the food chopper of FIG. 1.

A food chopper 100 conveniently and quickly chops larger pieces of food into smaller pieces of food without the need for several strokes of a knife. A food chopper 100 also contains the food as the food is chopped, preventing messes.

To use the food chopper 100, a user places a piece of food under the food chopper 100 and within the food chopper's 100 food chopping compartment 265 (see FIG. 3). The user then presses on the plunger 210 of the food chopper 100, which causes the blades 240 of the food chopper 100 to displace downward, chopping the food. When the user releases the plunger 210, the blades 240 retract upward, rotating slightly. The user then presses on the plunger 210 once again, causing the blades 240 to displace downward, slicing the food at a different angle than the first slice. The process can be repeated until the food has been chopped to the user's liking.

Many food chopper 100 designs are known. In embodiments of the present invention, shown in FIGS. 1a-3, the food chopper 100 comprises a plunger 210, plunger cap 205, shaft 215, biasing member 220, channel top 225, body 230, blade frame 235, blade 240, blade cleaner 245, windowed 250 food chopping compartment 265, base 255, and, optionally, a window cap 260. In some embodiments, not all of the elements listed above are present. For example, some food choppers 100 do not have a plunger cap 205, blade cleaner 245, base 255, or window cap 260.

In exemplary embodiments of the present invention, the plunger 210 of a food chopper 100 is a substantially cylindrical, hollow insert. The upward end of the plunger 210 has rounded edges, and receives the plunger cap 205. The plunger 210 and plunger cap 205 assembly creates a blunt pushing surface that a user can push on without risk of injury to the user's hand. In some embodiments, the plunger 210 can have a raised, retracted position (see FIG. 1a) and a lowered, chopping position (see FIG. 1b). A user pushes the plunger 210 from the retracted position to the chopping position.

In some embodiments, the plunger 210 receives and engages a shaft 215. The shaft 215 is a substantially cylindrical, hollow member. A first end 216 of the shaft 215 can have a rim that fits in a cavity of the plunger 210. The rim and cavity arrangement prevents the plunger 210 and the shaft 215 from becoming disengaged, even when the plunger 210 and shaft 215 are pushed and pulled in various directions. The shaft can also comprise prongs 218. The prongs 218 are outward protruding members on the side of the shaft 215. In some embodiments, the shaft 215 can have a raised, retracted position and lowered, chopping position corresponding to the plunger's 210 retracted position and chopping position.

In some embodiments, a food chopper 100 can further comprise a channel top 225. The channel top 225 is also a substantially cylindrical element with a hollow center. The channel top 225 is sized to receive the shaft 215 through the hollow center. Moreover, the channel top 225 comprises a serrated bottom half with a plurality of teeth. In some embodiments, the teeth can have an angled side and a substantially vertical side. In some embodiments, the channel top 225 further comprises a tab to engage the plunger 210.

The shaft 215 passes through and is at least partially disposed within the channel top 225. In some embodiments, the shaft 215 rotatably engages the channel top 225 so that the shaft 215 and the channel top 225 rotate in unison.

In exemplary embodiments of the present invention, a biasing member 220 is disposed around the shaft 215. The biasing member 220 engages the shaft 215 and/or the plunger 210, and also engages the channel top 225. In this manner, when a user presses the plunger 210 to the chopping position, and subsequently releases the plunger 210, the biasing member 220 pushes the plunger 210 back to the retracted position. In exemplary embodiments, the biasing member 220 is a spring.

The food chopper 100 further comprises a body 230. The body 230 can be a generally cylindrical sleeve, but can have a variety of profiles. The body 230 comprises a receiving portion 231 to receive the plunger 210, shaft 215, biasing member 220, and channel top 225. In exemplary embodiments of the present invention, the body 230 comprises teeth that match the profile of the channel top's 225 teeth, i.e., the teeth have an angled side and a substantially vertical side. The channel top's 225 teeth can therefore engage the body's 231 teeth. The body's teeth can also engage the prongs 218 of the shaft 215. In this arrangement, as shown in FIG. 3, the shaft 215 passes through the channel top 225 and the receiving portion 231 of the body 230.

Figure 4A:
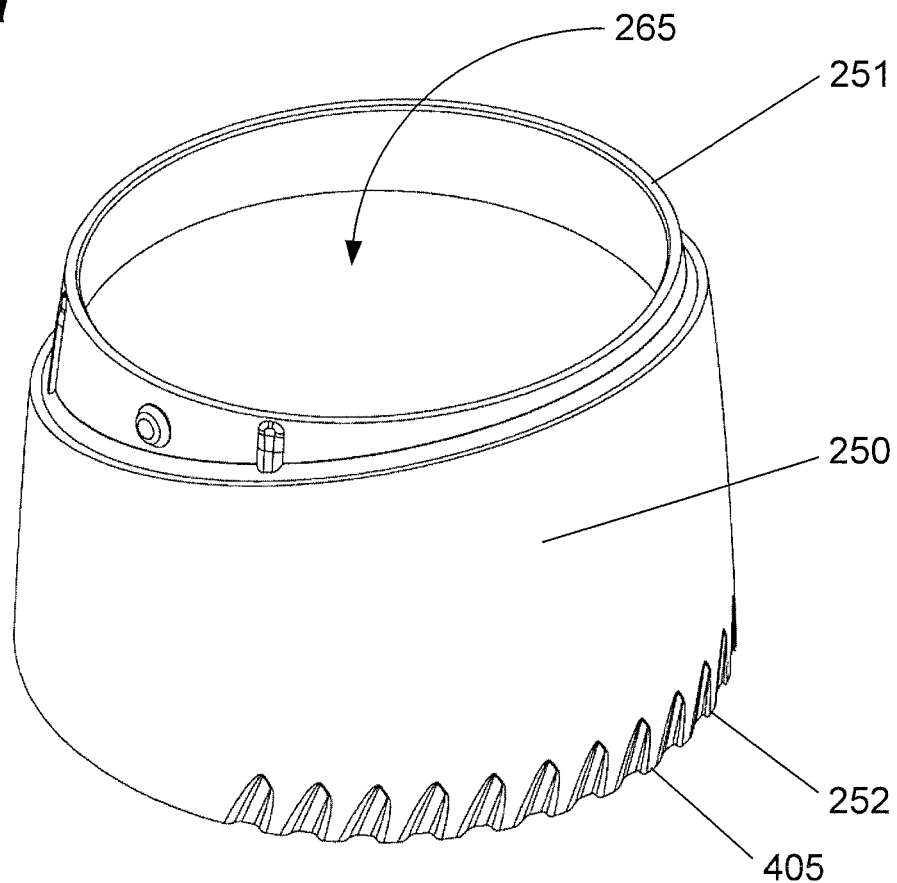
FIG. 4a is a perspective view of a food chopping compartment of a food chopper comprising an integrated cutting surface, in accordance with some embodiments of the present invention.
Figure 4B:
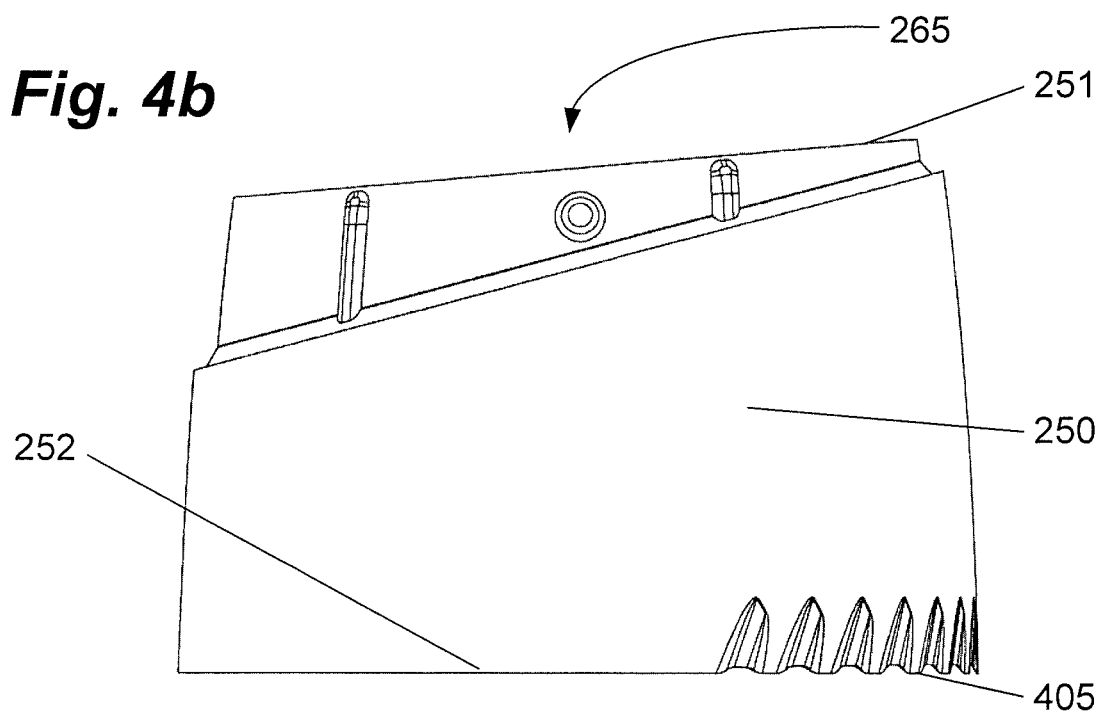
FIG. 4b is a side view of a food chopping compartment of a food chopper comprising an integrated cutting surface, in accordance with some embodiments of the present invention.
Figure 5:
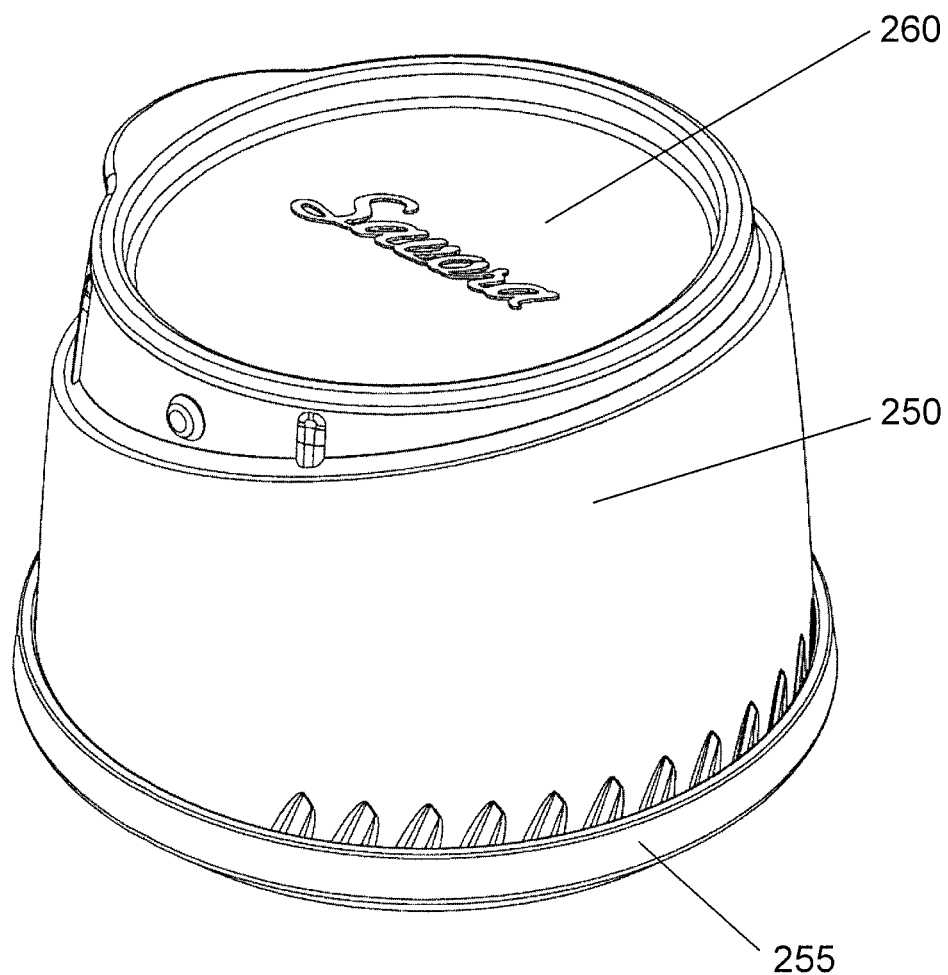
FIG. 5 is a perspective view of a food chopping compartment of a food chopper serving as a food storage container, in accordance with some embodiments of the present invention.

The body 230 has a windowed 250 food chopping compartment 265 removably engaged with a lower portion thereof. As shown in FIGS. 4a and 4b, the windowed 250 food chopping compartment 265 comprises an upper rim 251 and a lower rim 252. The windowed 250 food chopping compartment 265 is generally cylindrical, but can have a variety of profiles. Moreover, the windowed 250 food chopping compartment 265 provides structural support to the body 230, and holds the body 230 upright. The windowed 250 food chopping compartment 265 also defines the chopping chamber of the food chopper 100, which is where the food is chopped by the blades 240. The windowed 250 food chopping compartment 265 can be made of many materials, such as clear plastic or metal. In exemplary embodiments of the present invention, the window 250 is clear, allowing a user to see the food as it is chopped. In some embodiments of the present invention, as shown in FIG. 5, the windowed 250 food chopping compartment can double as a food storage container.

The blades 240 are attached to the blade frame 235. The blade frame 235 is disposed inside the body 230, and removably engages the shaft 215. The removable engagement of the shaft 215 and blade frame 235 is discussed in greater detail below.

In exemplary embodiments of the present invention, the blades 240 extend downward from the blade frame 235. The blades 240 also have a raised, retracted position and a lowered, chopping position. The retracted position and the chopping position of the blades 240 corresponds to the retracted position and the chopping position of the plunger 210 and the shaft 215. The blades 240 additionally comprise sharp lower edges. The sharp lower edges cut the food when the blades 240 move from the retracted position to the chopping position.

A blade cleaner 245 can be disposed proximate the blades 240 when the blades 240 are in the retracted position. The blade cleaner 245 can have slots that receive the blades 240 as the blades 240 move from the retracted position to the chopping position. The slots can contact the blades 240 or be disposed proximate the blades 240 as they move from the retracted position to the chopping position. The slots can also contact the blades 240 or be disposed proximate the blades 240 as they move from the chopping position back to the retracted position. Accordingly, as the blades 240 move from the chopping position back to the retracted position, the blade cleaner 245 scrapes food from the blades 240. In this manner, the blade cleaner 245 allows removed food to be chopped by subsequent passes of the blades 240. Moreover, the blade cleaner 245 prevents food from entering the body 230 of the food chopper 100, where it could spoil or disrupt the mechanics of the food chopper 100.

To use the food chopper 100, a user places a piece of food in the chopping chamber or compartment 265, and positions the body over the compartment. The user then presses on the plunger 210 of the food chopper 100, causing the plunger 210 to move from the retracted position to the chopping position. This, in turn, causes the shaft 215 to move from the retracted position to the chopping position. Moreover, because the second end 217 of the shaft 215 is engaged with the blade frame 235, the blade frame 235 and the blades 240 move from the retracted position to the chopping position, chopping the food. The user then releases the plunger 210. The biasing member 220 then causes the plunger 210, shaft 215, blade frame 235, and blades 240 to return to the retracted position. As the plunger 210, shaft 215, blade frame 235, and blades 240 retract, the prongs 218 of the shaft 215 slide along the angled side of the body's 230 teeth, causing the shaft 215 to rotate. The angled side of the body's 230 teeth can therefore form interior channels of the body 230. In some embodiments, the rotation of the shaft 215 is approximately 60 degrees, and can be a clockwise rotation or a counterclockwise rotation. In some embodiments, to ensure that the shaft 215 rotates each time the plunger 210 is released, the body 230 can comprise graduated ramps. In these embodiments, as the shaft 215 reaches the chopping position, the prongs 218 surmount the graduated ramps, rotating the shaft slightly and ensuring that the prongs 218 slide along the next set of teeth when the plunger 210 is released. After the plunger 210 is released, the user presses on the plunger 210 once again, slicing the food at a different angle than the first slice. This continual rotation of the blades insures evenly chopped pieces of food. This process can be repeated until the food has been chopped to the user's liking.

As shown in FIG. 5, in embodiments where the windowed 250 food chopping compartment/chamber 265 doubles as a food storage container, the windowed 250 food chopping compartment 265 can be removed from the body 230. The windowed 250 food chopping compartment 265 also has a base 255 removably engaged with the lower rim 252 of the window 250. The base 255 seals the lower opening of the window 250, allowing a user to place and store food inside of the window 250. The compartment cap 260 can then be placed on the upper opening of the window 250, engaging the upper rim 251, sealing the window 250, and creating a food storage container.

Figure 6:
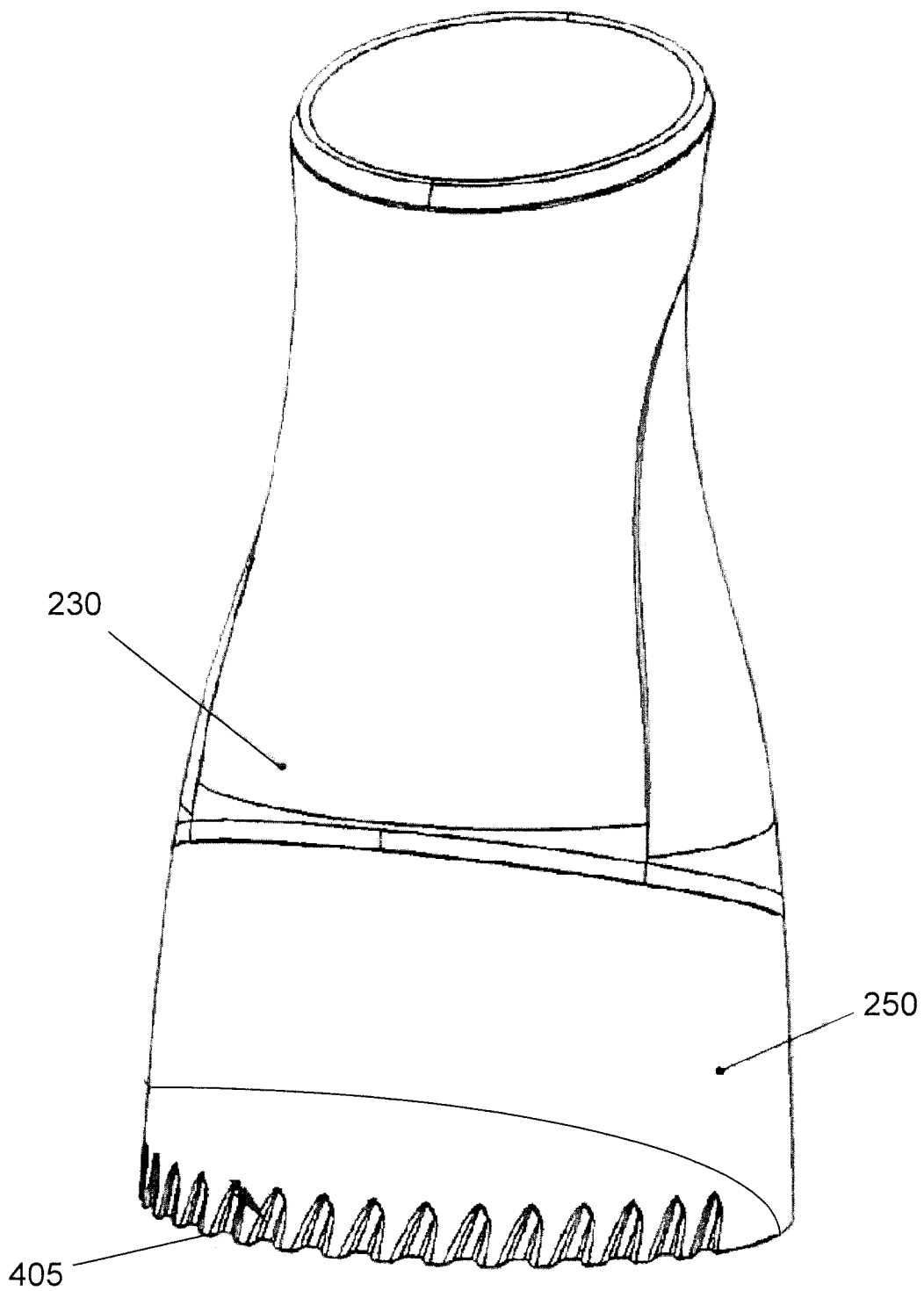
FIG. 6 is a side view of a food chopper with an integrated cutting surface comprising a separate material, in accordance with some embodiments of the present invention.
Figure 7:
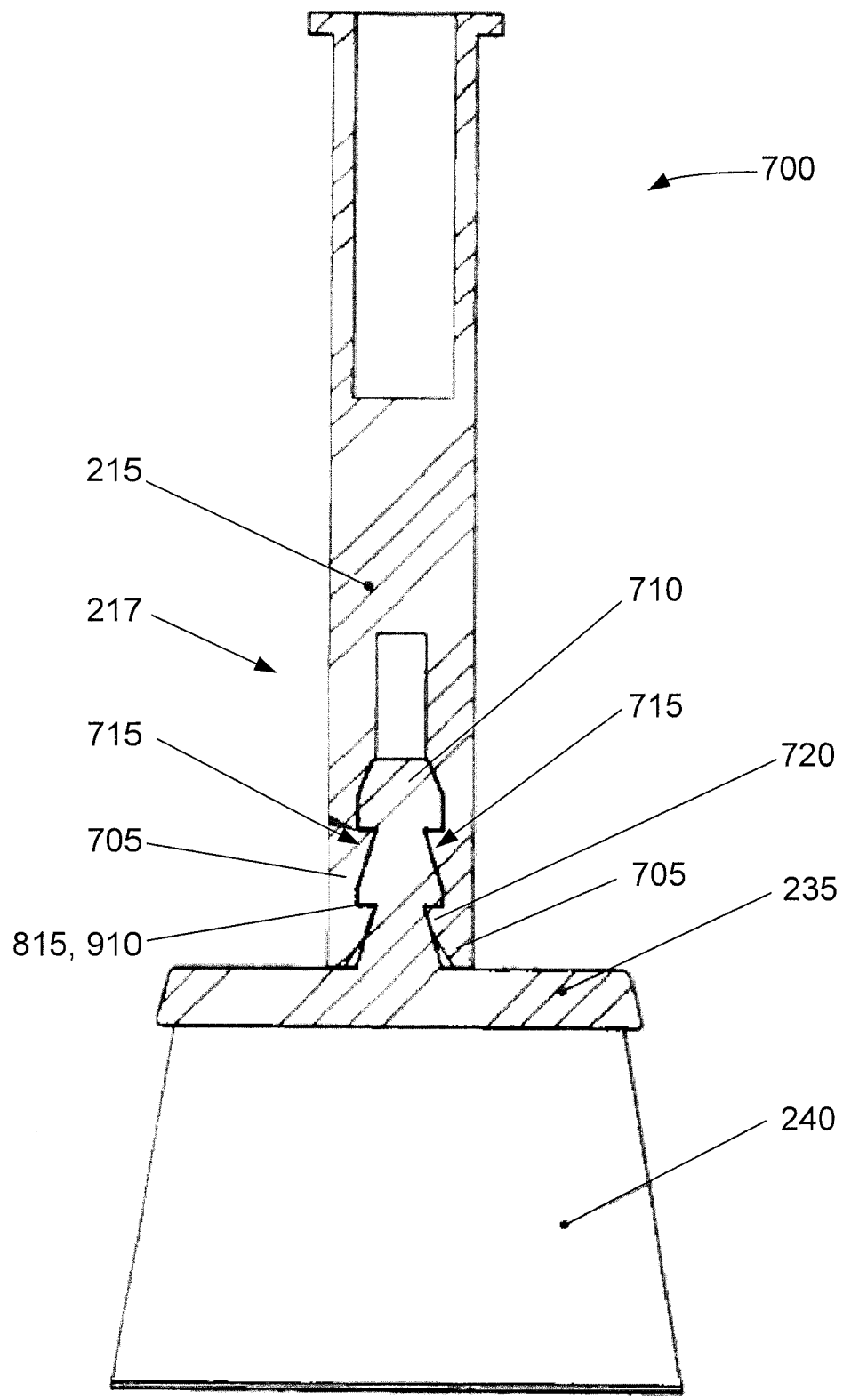
FIG. 7 is a cross-sectional view of a blade attachment mechanism, in accordance with some embodiments of the present invention.

Several other features can be incorporated into the food chopper 100 of the present invention. For example, as shown in FIGS. 4a, 4b, and 6, in exemplary embodiments of the present invention, the windowed 250 food chopping compartment 265 of a food chopper 100 can include an integrated cutting surface 405. In addition, as shown in FIGS. 7-9, the food chopper can comprise a novel blade attachment mechanism 700.

Integrated Cutting Surface

As shown in FIGS. 4a and 4b, a food chopper 100 can comprise an integrated cutting surface 405. In some embodiments, the integrated cutting surface 405 can be a sharpened portion of the lower rim 252 of the window 250. As shown in FIG. 6, the integrated cutting surface 405 can also be a separate piece of material incorporated into the windowed 250 compartment 265. For example, in some embodiments of the present invention, the windowed 250 compartment 265 is clear plastic, and the integrated cutting surface 405 is a sharpened portion of the lower rim of the clear plastic window 250. In other embodiments, the windowed 250 compartment 265 is clear plastic, and the integrated cutting surface 405 is a portion of sharpened metal incorporated into the windowed 250 compartment 265.

In embodiments with a metal cutting surface incorporated into the windowed 250 food chopping compartment 265, the sharpened metal can be incorporated into the window 250 in a variety of methods. For example, in some embodiments, the sharpened metal can be glued to the exterior of the window 250. In other embodiments, the windowed 250 compartment 265 can comprise a groove that receives a tongue of the sharpened metal, or the sharpened metal can comprise a groove that receives a tongue of the windowed 250 compartment 265. In still other embodiments, the sharpened metal can comprise tabs that engage the windowed 250 compartment 265. In all of these embodiments, the integrated cutting surface 405 of the sharpened metal can be substantially aligned with the remaining plastic portion, if any, of the lower rim 252.

The integrated cutting surface 405 can comprise a variety of cutting surfaces. For example and not limitation, the integrated cutting surface 405 can comprise a straight cutting edge, a serrated cutting edge (as shown in FIGS. 4a, 4b, and 6), or a combination of both. In embodiments where the integrated cutting surface 405 is plastic, a serrated edge can speed the cutting process and prevent the plastic from dulling quickly.

The integrated cutting surface 405 can also have a variety of edge angles and/or grinds. For example and not limitation, the integrated cutting surface 405 can have a hollow grind, flat grind, chisel grind, sabre grind, convex grind, or compound bevel grind.

In some embodiments, the entire lower rim 252 of the chopping compartment comprises the integrated cutting surface 405. In other embodiments, only a portion of the lower rim 252 comprises the integrated cutting surface 405. In exemplary embodiments, the integrated cutting surface 405 comprises less than 190 degrees of the lower rim 252 (i.e., less than 190 degrees of the circumference of the lower rim 252), preferably between 130 and 180 degrees. This leaves some portion of the lower rim 252 dull, allowing a user to grip the lower rim 252 without cutting his or her hand. However, any portion of the lower rim 252 can comprise the integrated cutting surface 405.

The integrated cutting surface 405 allows a user to cut larger foods into smaller pieces that will fit inside the chopping compartment/chamber 265. This prevents a user from needing a knife to separately cut food into smaller pieces. For example, many full-sized carrots will not fit into the chopping compartment/chamber 265 of a conventional food chopper 100. Thus, a user previously needed to use knife to cut a carrot into smaller pieces before the carrot would fit into the chopping chamber 265 for finer chopping. This leads to wasted time and additional dirty kitchen utensils, and requires a user to manually place the food inside of the chopping chamber 265. However, the integrated cutting surface 405 of the present invention can cut a carrot into smaller pieces without the need for a knife. Thus, time is saved and additional kitchen utensils are not soiled. Moreover, the cut pieces do not need to be manually moved inside of the chopping chamber 265.

To use the integrated cutting surface 405, a user first lifts the food chopper 100 off of the counter or cutting board that it is operating on. The user then places the piece of food under the integrated cutting surface 405, partially inside and partially outside the chopping chamber 265. The user then pushes down on the food chopper 100, causing the integrated cutting surface 405 to cut the item of food. The portion of the item of food that is to be chopped is now conveniently inside the chopping chamber 405. Thus, after a user cuts the carrot with the integrated cutting surface 405, the smaller pieces are already inside the chopping chamber 265, ready to be chopped. This eliminates the need to place the chopped food into the chopping chamber 265, thereby saving time and preventing the user from having to touch the food. In addition, because the integrated cutting surface 405 is on the exterior of the window 250, it is easily accessible.

In embodiments of the present invention wherein the integrated cutting surface 405 is a sharpened portion of the lower rim 252 of the window 250, no additional components are necessary. Thus, the integrated cutting surface 405 adds functionality to a food chopper 100 without requiring a manufacturer to produce extra parts, which saves cost. In addition, material is conserved because the sharp integrated cutting surface 405 requires less plastic or metal than a traditional dull lower rim 252, also saving cost.

In embodiments of the present invention incorporating the integrated cutting surface 405, the base of the window 250 can engage the lower rim of the window 250. The base can therefore conceal the integrated cutting surface 405. In this manner, a user can chop food with the integrated cutting surface 405 and food chopper 100, clean the food chopper 100, and apply the base to prevent injury to the user when the food chopper 100 is placed in or removed from storage.

As shown in FIG. 7, in exemplary embodiments of the present invention, the food chopper 100 can comprise a novel blade attachment mechanism 700. As mentioned above, the blade frame 235 of the food chopper 100 engages the shaft 215. However, the blade frame 235, and thus the blades 240, should be removable from the shaft 215 so that the blades 240 and blade frame 235 can be properly cleaned. The blade attachment mechanism 700 of the present invention therefore allows for quick and easy removal of the blade frame 235 from the shaft 215.

The blade attachment mechanism 700 comprises at least a portion of the second end 217 of the shaft 215. In exemplary embodiments of the present invention, at least a portion of the second end 217 of the shaft 215 comprises a plurality of flexible flanges 705.

Figure 8A:
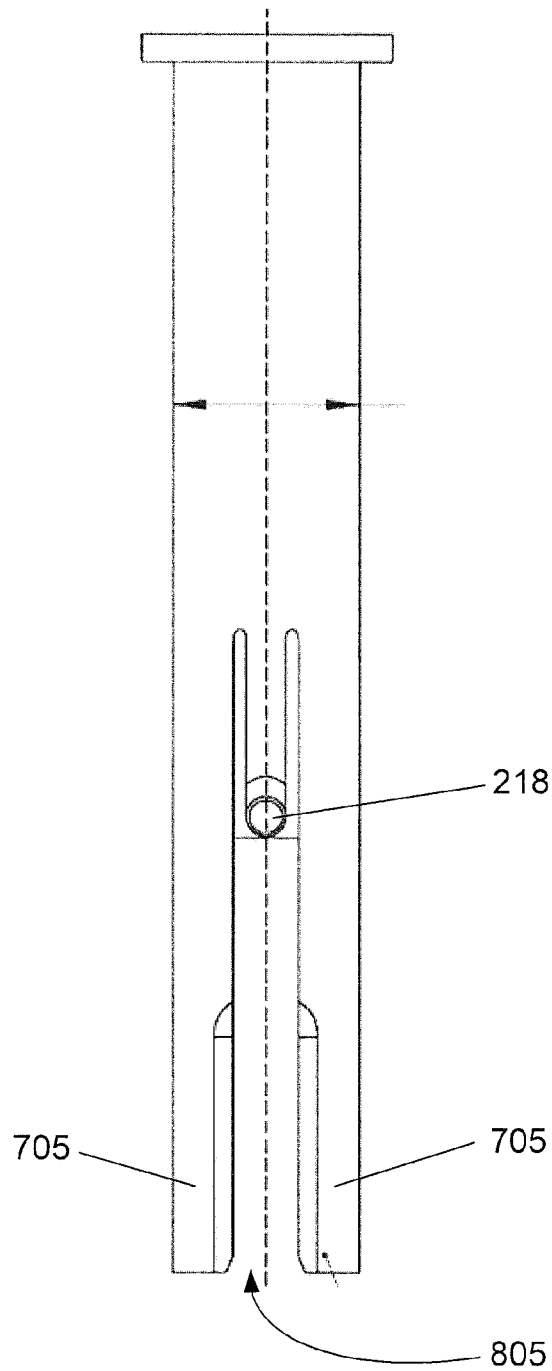
FIG. 8a is a side view of a shaft comprising two flexible flanges, in accordance with some embodiments of the present invention.
Figure 8B:
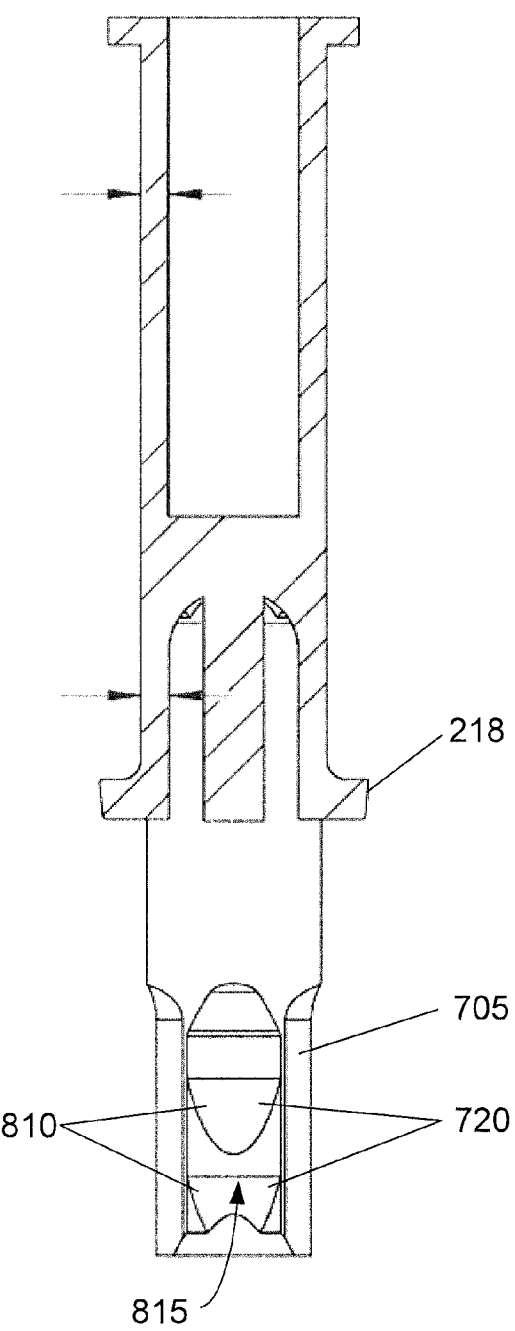
FIG. 8b is a cross-sectional view of the shaft of FIG. 8a, in accordance with some embodiments of the present invention.
Figure 9:
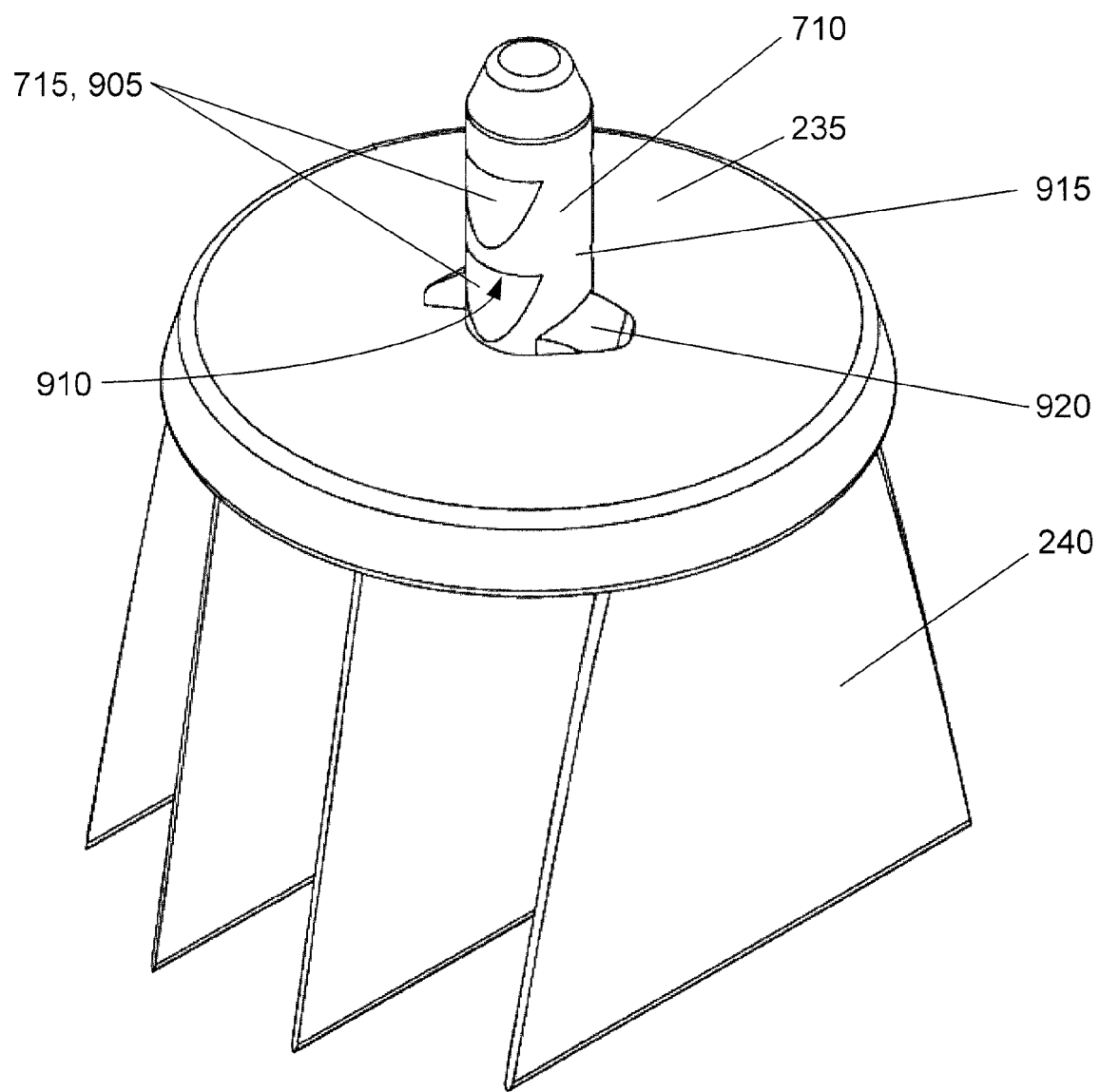
FIG. 9 is a perspective view of a blade frame with a shank comprising cavities, in accordance with some embodiments of the present invention.

As shown in FIG. 8a, in some embodiments, the second end 217 of the shaft 215 comprises two flanges 705. The flanges 705 can define a substantially cylindrical orifice 805 for receiving a shank 710 of the blade frame 235. Moreover, the flanges 705 can flex outward to allow the shank 710 to be inserted into and removed from the orifice 805. In some embodiments, the flanges 705 are sufficiently resilient to prevent outward flexing until a sufficient force is applied. In these embodiments, the flanges 705 will flex back to their inward positions when the sufficient force ceases.

As shown in FIGS. 7 and 9, and as mentioned above, the blade attachment mechanism 700 comprises a shank 710 disposed on the upper surface of the blade frame 235. The shank 710 is substantially cylindrical, and is adapted to fit in the orifice 805 of the shaft 215. The shank 710 also comprises a plurality of cavities 715. In some embodiments, the shank 710 comprises four cavities 715, with two sets of cavities 715 on opposing sides of the shank 710. As shown in FIGS. 7 and 9, the cavities 715 can be scoop shaped. Accordingly, the cavities 715 can have a rounded, concave sidewall 905 with a blunt, inwardly receding upper wall 910.

The flanges 705 of the shaft 215 can comprise interior teeth 720. The interior teeth 720 can be shaped to fit inside of the cavities 715 of the shank 710. Likewise, the cavities 715 can be shaped to receive the interior teeth 720. In this manner, the interior teeth 720 and the cavities 715 can interlock. Accordingly, the interior teeth 720 can each have a rounded, convex sidewall 810 with a blunt, outwardly protruding upper wall 815. In some embodiments, the flanges 705 of the shaft 215 comprise four interior teeth 720, with two interior teeth 720 on each of the two flanges 705. In some embodiments, the flanges 705 have a number of interior teeth 720 corresponding to the number of cavities 715 on the shank 710.

To insert the blade frame 235 into the shaft 215, a user holds the blade frame 235 so that the cavities 715 are aligned with the interior teeth 720 of the flanges 705. The user then pushes the shank 710 of the blade frame 235 into the orifice 805, causing the flanges 705 to flex outward. When the shank 710 is fully inserted into the orifice 805, the interior teeth 720 of the flanges 705 engage the cavities 715 of the shank 710, and the flanges 705 flex inward. The blade frame 235 is now engaged with the shaft 215, and the food chopper 100 can be used. Alternatively, a user can insert the shank 710 into the orifice 805 without aligning the cavities 715 and the interior teeth 720. In this manner, once the shank 710 is fully inserted into the orifice 805, the blade frame 235 is rotated until the interior teeth 720 of the flanges 705 engage the cavities 715 of the shank 710.

When the blade frame 235 is inserted into the shaft 215, the blade frame 235 cannot be removed from the shaft 215 by simply pulling down on the blade frame 235. This is because the inwardly receding upper wall 910 of the cavities 715 and the outwardly protruding upper wall 815 of the interior teeth 720 abut each other, preventing relative vertical movement of the blade frame 235 and shaft 215. This interaction between the inwardly receding upper wall 910 of the cavities 715 and the outwardly protruding upper wall 815 of the interior teeth 720 also prevents the shank 710 of the blade frame 235 from slipping relative to the shaft 215 when the food chopper 100 chops food.

To remove the blade frame 235 for cleaning, a user must therefore twist the blade frame 235 relative to the shaft 215. When the user twists the blade frame 235 relative to the shaft 215, the convex sidewalls 810 of the interior teeth 720 and the concave sidewalls 905 of the cavities 715 rotate relative to each other. This relative rotation causes outward movement of the interior teeth 720, which in turn provides a sufficient leveraging force to the flexible flanges 705, causing the flanges 705 to flex outward. The force required to flex the flanges 705 outward is large enough that the blade frame 235 does not accidentally become disengaged from the shaft 215 when the food chopper 100 is in use, but small enough that a user can easily twist the blade frame 235, facilitating removal. When the blade frame 235 is twisted approximately 90 degrees, the interior teeth 720 and the cavities 715 are no longer aligned. Instead, smooth surfaces 915 of the shank 710 are aligned with the interior teeth 720 of the flanges 705. The user can now pull the blade frame 235, and hence the blades 240, directly out of the shaft 215. The blade frame 235 and blade 240 assembly can now be cleaned.

As described above, the shaft 215, blade frame 235, and blades 240 rotate as a user repeatedly presses on the plunger 210 to chop food. If food were to clump together in the chopping compartment/chamber 265, however, the food could grip the blades 240, holding the blades 240 and blade frame 235 still as the shaft 215 continues to rotate. This could cause the blade frame 235 to rotate relative to the shaft 215, thereby making it possible for the blade frame 235 and the shank 710 to become disengaged.

To prevent this from happening, in exemplary embodiments of the present invention, ramps 920 are disposed proximate the bottom of the shank 710 and the top of the blade frame 235. In use, the ramps 920 abut the flanges 705 of the shaft 215, allowing the blade frame 235 to be rotated in one direction only. Accordingly, the ramps 920 prevent the blade frame 235 (and the shank 710) from rotating relative to the shaft 215 when clumping food grips the blades 240, thereby preventing the blade frame 235 and the shaft 215 from becoming unintentionally disengaged.

Other embodiments of the present invention do not comprise ramps 920. In these embodiments, to prevent the blade frame 235 and shaft 215 from disengaging, the flanges 705 can be sufficiently resilient that the force applied by the food to the blades 240 cannot rotate the blade frame 235 relative to the shaft 215. In other words, the flanges 705 can be stiff enough to prevent the interior teeth 720 from twisting out of the cavities 715 even when food is gripping the blades 240 and resisting the rotation of the blade frame 235.

In exemplary embodiments of the present invention, the second end 217 of the shaft 215, which comprises the flanges 705, comprises a durable plastic that is not brittle, such as nylon. Such a material will allow the flanges 705 to flex outward and inward repeatedly without breakage due to fatigue.

In some embodiments of the present invention, certain parts of the blade attachment mechanism 700 can be reversed. For example, the shaft 215 can comprise a shank 710, and the blade frame 235 can comprise flexible flanges 705. These embodiments can further comprise interior teeth 720 and cavities 715, as described above, and can function in substantially the same manner as the embodiments previously described.

In other embodiments of the present invention, the second end 217 of the shaft 215, or the shank 710, can be a shape other than cylindrical. For example, the second end 217 of the shaft 215 and/or the shank 710 could have a square, rectangular, or triangular cross-section, among other shapes. These embodiments can further comprise interior teeth 720 and cavities 715, as described above, and can function in substantially the same manner as the embodiments previously described.

FIGS. 10-16 show an alternative preferred implementation of the food chopper of the present invention. As will be shown and described, in this implementation the straight blades shown in FIGS. 1-9 have been replaced with V-shaped blades. However, such change also requires a change in the blade cleaner, which is described below. The use of V-shaped blades provides a greater cutting or chopping action, and allows for a blade configuration where no two blades are parallel to each other. This allows the chopped food to slide outward during use into the larger space toward the top of the V. The angle of each V-shaped blade is an acute angle and is configured to work with the rotation of the blade holder to release the chopped food as the assembly rotates back and up into the starting position.

Figures 10A, 10B:
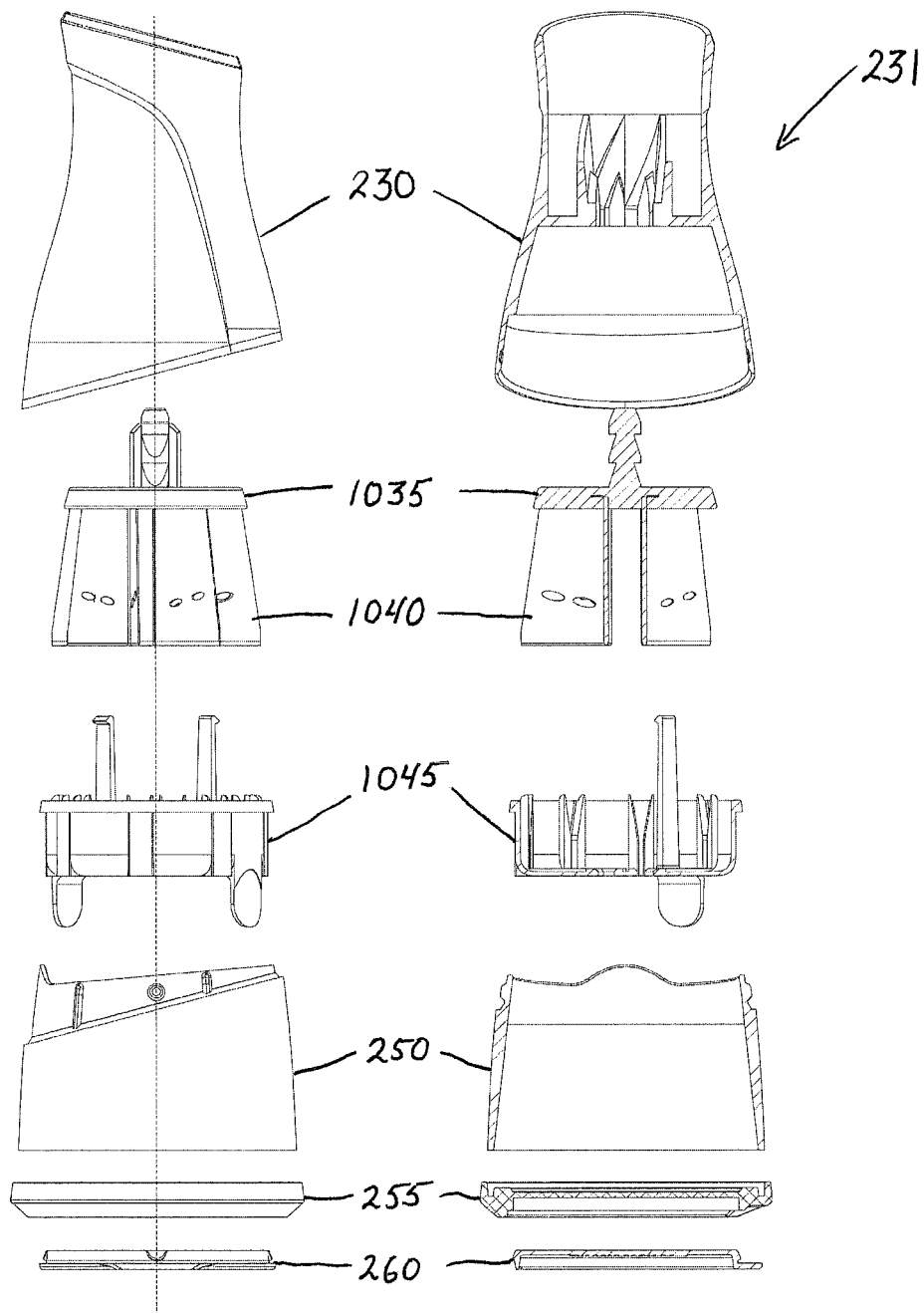
FIGS. 10A and 10B show an exploded view of the Food Chopper according to an alternative embodiment of the present invention.
Figure 11:
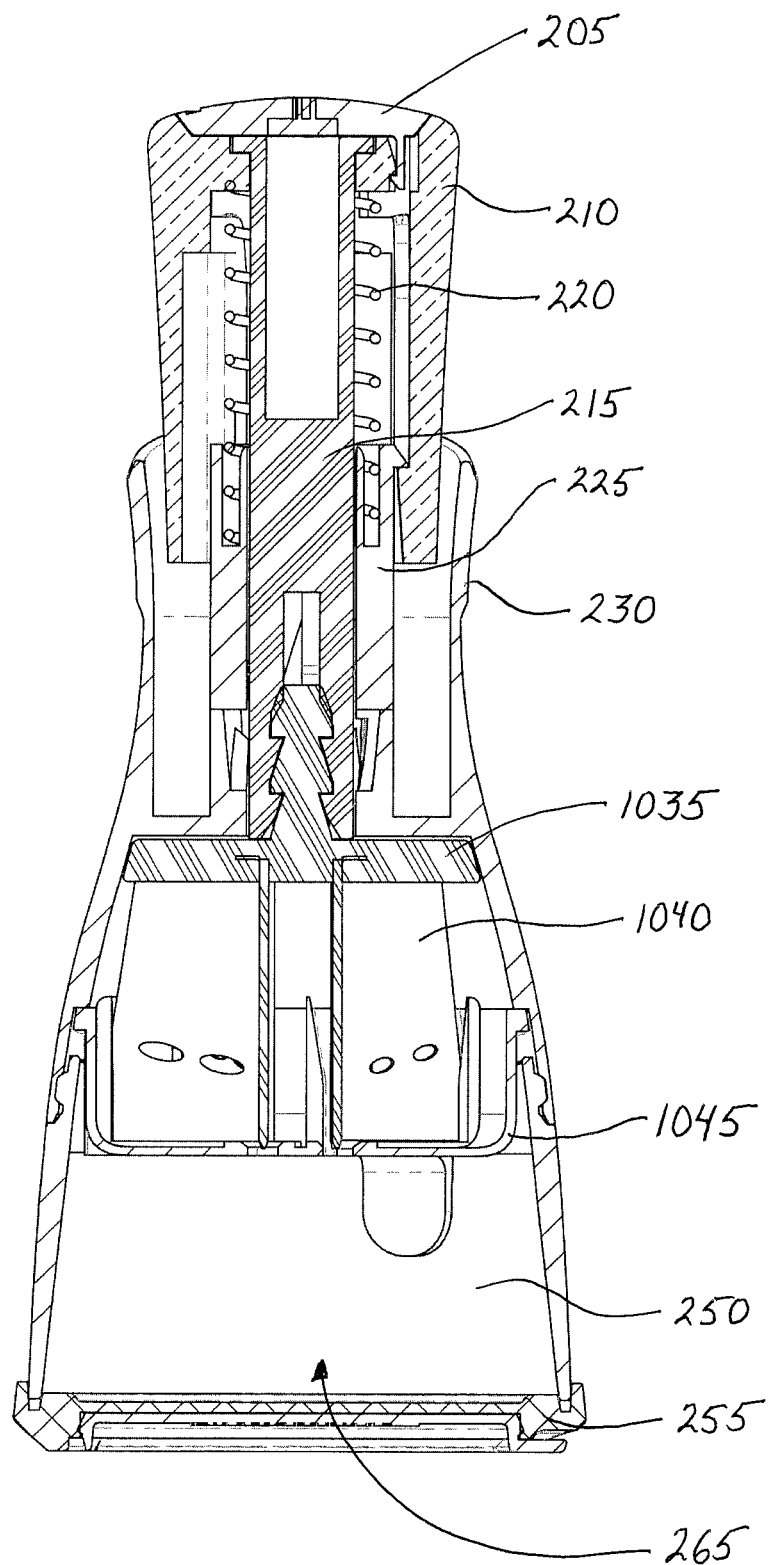
FIG. 11 shows a cross sectional view of the food chopper of FIG. 1 with the alternative blade arrangement shown in FIGS. 10A and 10B.

Referring to FIGS. 10A, 10B and 11, the body 230 has a cutting or chopping chamber 265 that includes a window 250 and which is removably engaged with a lower portion of the body 230. As described above with respect to FIGS. 4a and 4b, the window 250 comprises an upper rim 251 and a lower rim 252. The window 250 is generally cylindrical, but can have a variety of profiles. Moreover, the windowed 250 chopping compartment 265 provides structural support to the body 230, and holds the body 230 upright. The windowed 250 chopping compartment defines the chopping chamber 265 of the food chopper 100, which is where the food is chopped by the blades 240, 1040. The windowed 250 compartment can be made of many materials, such as clear plastic or metal. In exemplary embodiments of the present invention, the window 250 is clear, allowing a user to see the food as it is chopped within the chopping compartment/chamber 265. In some embodiments of the present invention, as shown in FIG. 5, the chopping chamber 265 with window 250 can double as a food storage container.

The blades 1040 are V-shaped and are attached to the blade frame 1035. The blade frame 1035 is disposed inside of the chopping chamber 265 and the body 230, and engages the shaft 215.

In exemplary embodiments of the present invention, the V-shaped blades 1040 extend downward from the blade frame 1035. As with the straight blade embodiment of FIGS. 1-9, the V-shaped blades 1040 also have a raised, retracted position and a lowered, chopping position. The retracted position and the chopping position of the blades 1040 corresponds to the retracted position and the chopping position of the plunger 210 and the shaft 215. The V-shaped blades 1040 additionally comprise sharp lower edges. The sharp lower edges cut the food when the blades 1040 move from the retracted position to the chopping position.

Figure 12:
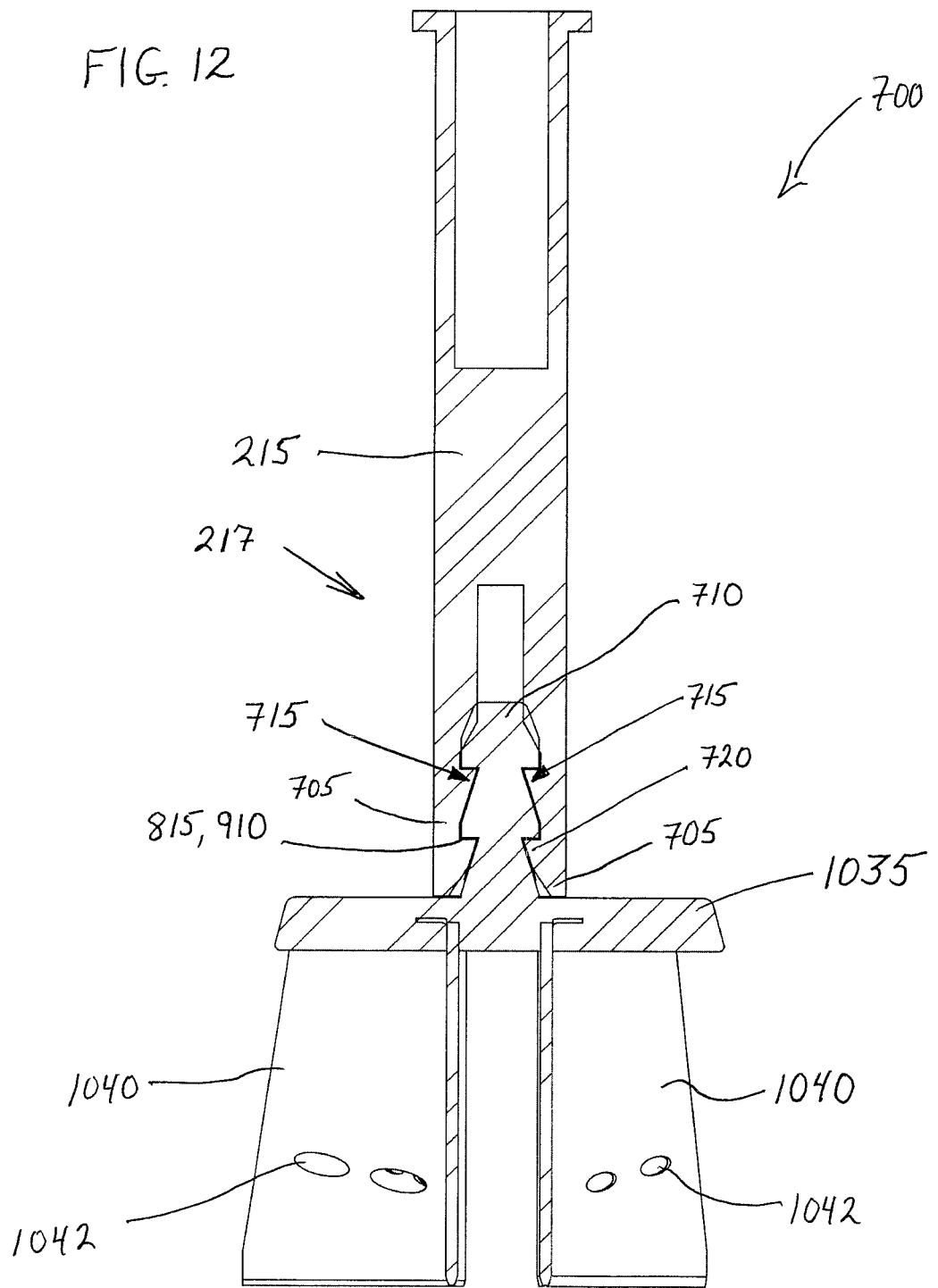
FIG. 12 shows a cross sectional view of the alternative blade mechanism in accordance with the alternative embodiment of the present invention.

FIG. 12 shows the blade attachment mechanism 700 having the alternative blade frame 1035 with V-shaped blades 1040. In this embodiment, the V-shaped blades 1040 include at least one friction reducing element 1042 such as a hole or an indentation. The friction reducing elements 1042 function to assist in the removal of chopped food products from the blades during operation of the chopper by allowing air under the food being chopped and preventing an suction being formed between the food being chopped and the blade surfaces. The operation of plunger 700 is the same as described above with respect to FIG. 7 and will not be repeated here.

Figure 13:
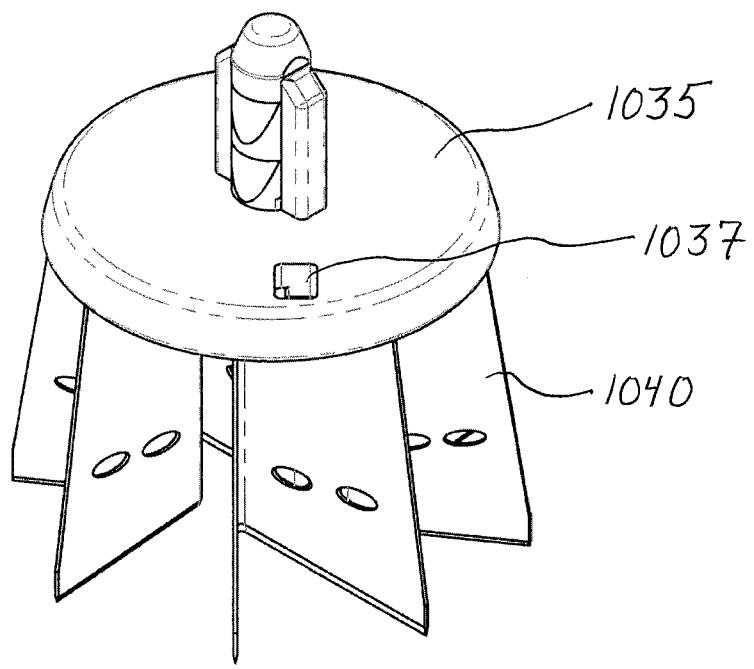
FIG. 13 is a perspective view of the blade frame according to the alternative embodiment of the present invention.
Figure 14:
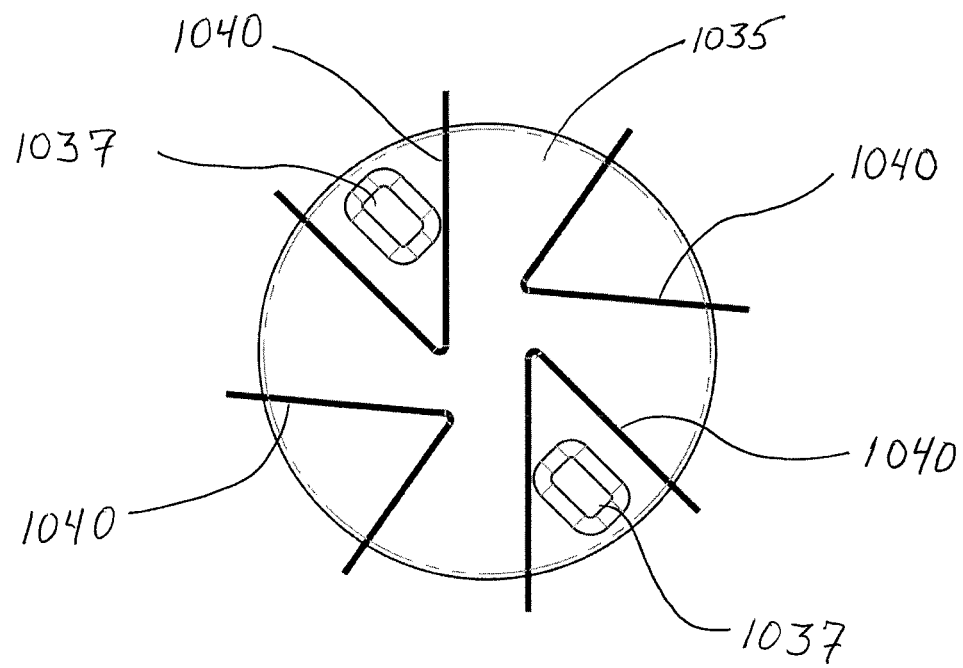
FIG. 14 is a bottom view of the blade frame according to the alternative embodiment of the present invention.
Figure 15:
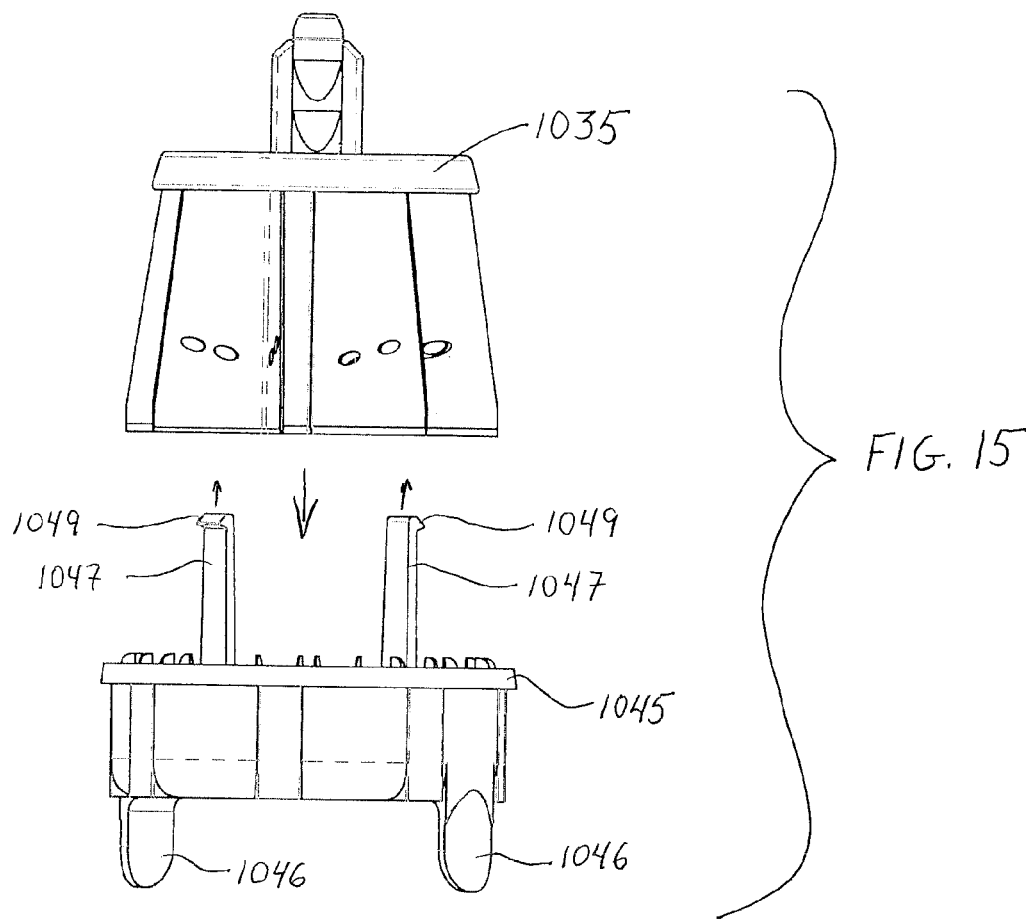
FIG. 15 is a plan view of the blade frame and blade cleaner according to the alternative embodiment of the present invention.
Figure 16:
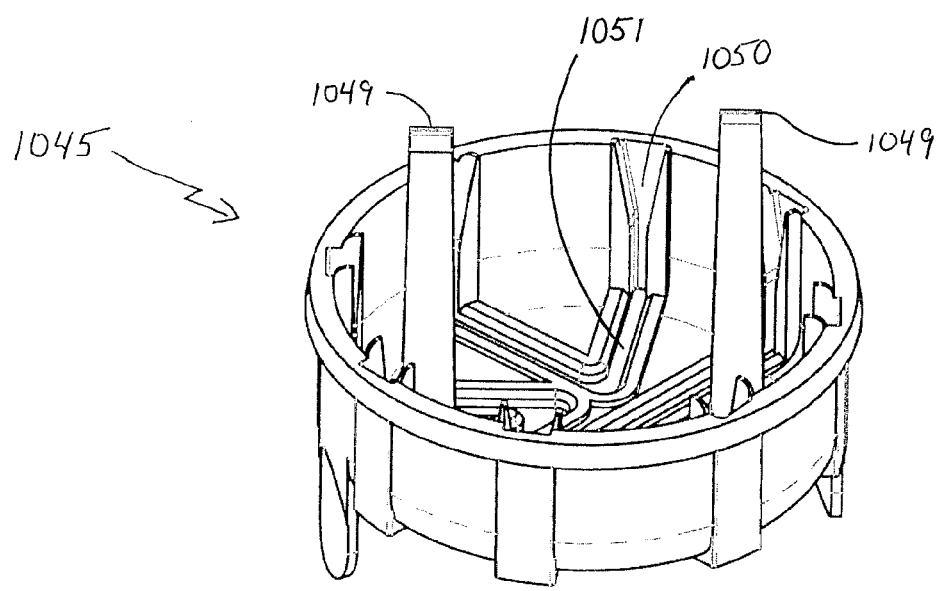
FIG. 16 is a perspective view of the blade cleaner according to the alternative embodiment of the invention.

FIGS. 13 and 14 shows the blade frame 1035 having openings 1037 in the surface thereof. As shown in FIGS. 15 and 16, the blade cleaner/cover 1045 includes upwardly extending arms 1047 each having a tab 1049 at the top end thereof. As will become obvious, the openings 1037 in the blade frame 1035 receive the tabs 1049 which "snap" fit into the same so as to position the blade cover 1045 in its operable position receiving the V-shaped blades.

Referring to FIGS. 15 and 16, the blade cleaner/cover 1045 of this alternative embodiment is configured to attach to the blade frame 1035 and additionally to the chopping compartment 265 with window 250 (See FIG. 11). In this manner, aside from removing food from the blades as they return to the starting position, another significant benefit of this alternative design is that the sharp bottom edges of the blades will remain covered by the blade cleaner/cover 1045 regardless of the position they are in. Thus, when the chopping compartment/chamber 265 is removed from the chopper body 230, the blade cleaner 1045 remains in position (via snap tabs 1049) so as to shroud the blades and more importantly the lower cutting edges of the V-shaped blades such that the same are never exposed to a user handling the separated parts.

The blade cleaner/cover 1045 preferably has V-shaped slots 1050 and corresponding V-shaped openings 1051 (See FIG. 16) that receive the V-shaped blades 1040 as the blades move from the retracted position to the chopping position. The slots/openings 1050/1051 can contact the blades 1040 or be disposed proximate the blades 1040 as the blades move from the retracted position to the chopping position. The openings 1051 can also contact the blades 1040 or be disposed proximate the blades 1040 as the blades move from the chopping position back to the retracted position. Accordingly, as the blades 1040 move from the chopping position back to the retracted position, the blade cleaner 1045 operates to scrape food from the blades 1040. In this manner, the blade cleaner 1045 allows removed food to be chopped by subsequent passes of the blades 1040. Moreover, the blade cleaner 1045 not only operates to prevent the sharp edges of the blades from being exposed when the chopper body 230 is removed from the chopping chamber 265, but also serve to prevent food from entering the body 230 of the food chopper 100, where it could spoil or disrupt the mechanics of the food chopper 100.

Numerous characteristics and advantages have been set forth in the foregoing description, together with details of structure and function. While the invention has been disclosed in several forms, it will be apparent to those skilled in the art that many modifications, additions, and deletions, especially in matters of shape, size, and arrangement of parts, can be made therein without departing from the spirit and scope of the invention and its equivalents as set forth in the following claims. Therefore, other modifications or embodiments as may be suggested by the teachings herein are particularly reserved as they fall within the breadth and scope of the claims here appended.

What is claimed is:

1. A food chopper comprising:
    a body having an upper end and a lower end
    a blade mechanism comprising:
        a blade holder; and
        at least two separate and distinct V-shaped blades fixed to the blade holder, each having an apex thereof pointing inward with respect to an outer surface of the food chopper, said at least two V-shaped blades being positioned such that no one leg of any of said at least two V-shaped blades is parallel with any adjacent leg of any other of said at least two V-shaped blades; and
    a food chopping compartment releasably connected to the lower end of the body,
    wherein the at least two V-shaped blades come into contact with a food chopping surface of the food chopping compartment during operation of the food chopper.

2. The food chopper according to claim 1, wherein said food chopping compartment comprises:
    an upper open end configured for releasable connection to the lower end of the body; and
    a bottom formed as the food chopping surface, the food chopping surface being releasable from said food chopping compartment to allow the removal of chopped food without requiring removal of the food chopping compartment from the body.

3. The food chopper according to claim 1, further comprising:
   a blade cover/cleaner configured to be attached to a blade holder of the blade mechanism, said blade cover/cleaner being configured to maintain a cover over said at least two V-shaped blades when the food chopper is not in use and when the body is separated from the food chopping compartment.

4. The fond chopper according to claim 3, wherein said blade cover/cleaner comprises:
   means for connecting the blade cover/cleaner to the blade holder;
   at least two V-shaped slots configured to receive the at least two V-shaped blades;
   at least two V-shaped openings at the bottom of the at least two V-shaped slots, said at least two V-shaped openings allowing the at least two V-shaped blades to move into and out of the food chopping compartment during use, and allowing the removal of chopped food from the at least two V-shaped blades when said blade is retracted back into the blade cover/cleaner.

5. The food chopper according to claim 4, wherein an angle of the V for said at least two V-shaped blades and corresponding at least two V-shaped slots and at least two V-shaped openings comprises an acute angle.

6. The food chopper according to claim 3, wherein said blade mechanism further comprises a biasing mechanism configured to bias the blade mechanism upward such that said at least two V-shaped blades remains covered by the blade cover/cleaner even when the body is separated from the food chopping compartment.

7. The food chopper according to claim 1, wherein an angle of the V for each of said at least two V-shaped blades comprises an acute angle, wherein two of said at least two V-shaped blades have different acute angles.

8. The food chopper according to claim 1, wherein said food chopping compartment further comprises a transparent window for allowing visual inspection of the chopped food while still within the compartment.

9. The food chopper according to claim 1, wherein said food chopping compartment further comprises a cutting surface integrated into at least a portion of an exterior surface thereof.

10. A food chopper comprising:
    a body having an upper end and a lower end, the body further comprising:
       a plunger positioned within the upper end of the body and extending toward the lower end;
       a blade mechanism coupled to and movable with the plunger and having at least two separate and distinct V-shaped blades each having an apex thereof pointing inward with respect to an outer surface of the food chopper and being attached to a blade holder in communication with the blade mechanism, said at least two separate and distinct V-shaped blades being arranged on the blade holder such that no one leg of one V-shaped blades is parallel with any adjacent leg of any other of said at least two separate and distinct V-shaped blades, said plunger and said blade mechanism being biased upward;
    a food chopping compartment releasably connected to the lower end of the body, said food chopping compartment having a food chopping surface at a bottom thereof; and
    a blade cover/cleaner configured to be attached to a blade holder of the blade mechanism such that said blade cleaner/cover maintains a cover over said at least two V-shaped blades both when the food chopper is not in use and when the food chopping compartment has been released from the body.

11. The food chopper according to claim 10, wherein said blade cover/cleaner comprises:
    means for connecting the blade cover/cleaner to the blade holder;
    at least two separate and distinct V-shaped slots configured to receive the at least two separate and distinct V-shaped blades;
    at least two V-shaped openings at the bottom of the at least two V-shaped slots, said at least two V-shaped openings allowing the at least two V-shaped blades to move into and out of the food chopping compartment during use, and allowing the removal of chopped food from the at least two V-shaped blades when said blade is retracted back into the blade cover/cleaner.

12. The food chopper according to claim 11, wherein an angle of the V for said at least two V-shaped blades and corresponding at least two V-shaped slot and at least two V-shaped opening comprises an acute angle.

13. The food chopper according to claim 11, wherein an angle of the V for each of said at least two V-shaped blades comprises an acute angle, wherein said at least two V-shaped blades have different acute angles.

14. The food chopper according to claim 10, wherein said food chopping compartment further comprises a transparent window for allowing visual inspection of the chopped food while still within the compartment.

15. The food chopper according to claim 10, wherein said food chopping compartment further comprises a serrated edge integrated into at least a portion of an exterior surface thereof.

16. A food chopper comprising:
    a body having an upper end and a lower end
    a blade mechanism comprising:
       a blade holder; and
       a plurality of independent V-shaped blades fixed to the blade holder and formed by at least two separate and distinct blade V-shaped blades each having an apex pointing inward with respect to an outer surface of the food chopper, said plurality of independent V-shaped blades being positioned such that no one leg of any of said plurality of independent V-shaped blades is parallel with any adjacent leg of any other of said plurality of independent V-shaped blades; and
    a food chopping compartment releasably connected to the lower end of the body and having a cutting surface integrated into at least a portion of an exterior surface thereof,
    wherein the plurality of V-shaped blade comes into contact with a food chopping surface of the food chopping compartment during operation of the food chopper.

* * * * *